Dec. 17, 1963  J. VLASIC  3,114,393
ROTARY VALVE APPARATUS
Filed June 22, 1962  3 Sheets-Sheet 1
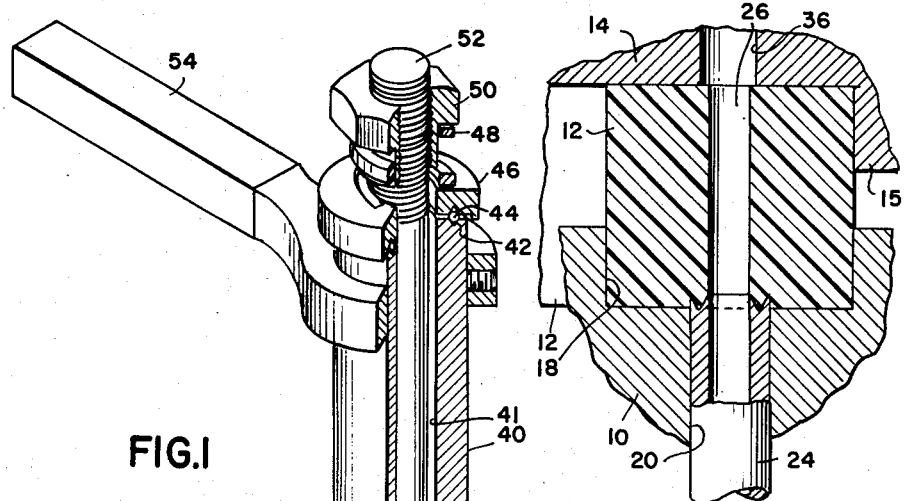
FIG. 1
FIG. 10
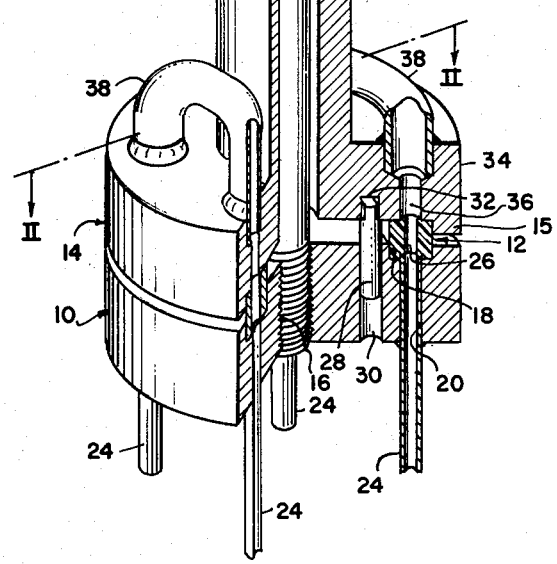
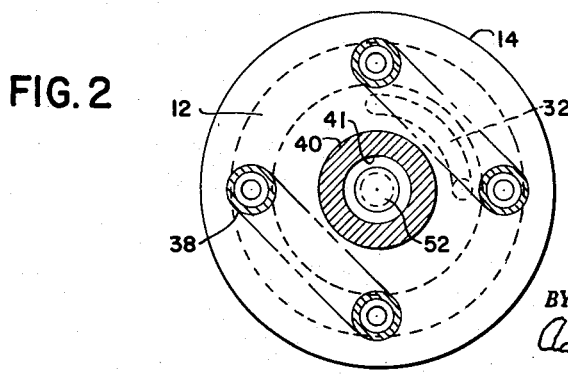
FIG. 2
INVENTOR.
JOHN VLASIC
BY Adams, Forward & McLean
ATTORNEYS Dec. 17, 1963 J. VLASIC 3,114,393
ROTARY VALVE APPARATUS
Filed June 22, 1962 3 Sheets-Sheet 2

INVENTOR.
JOHN VLASIC
BY Adams, Forward and McLean
ATTORNEYS

Dec. 17, 1963   J. VLASIC   3,114,393
ROTARY VALVE APPARATUS

Filed June 22, 1962   3 Sheets-Sheet 3

INVENTOR.
JOHN VLASIC

BY
*Adams, Forward & McLean*

ATTORNEYS

United States Patent Office 3,114,393
Patented Dec. 17, 1963

3,114,393
ROTARY VALVE APPARATUS
John Vlasic, Harvey, Ill., assignor to Sinclair Research, Inc., New York, N.Y., a corporation of Delaware
Filed June 22, 1962, Ser. No. 204,577
1 Claim. (Cl. 137—625.18)

My invention relates to valves and in particular provides a rotary valve suitable for use in a gas chromatography system.

In chromatography minute quantities of vapors are passed through tubes in which they are separated by differential rates of solution in carefully prepared solvent films in the tubes. Lubricants, being other than carefully prepared solvent films, must be excluded from the system so a valve suitable for gas chromatography must have lubricant-free seals. Other requirements for such a valve are an absence of dead spaces such as T, out-of-flow line hollows, or cavities; minimum leakage from one port to another and from ports to the exterior; and operability at high temperatures on the order of 250° C.

Previous gas chromatography valve systems were limited to maximum temperatures of about 200° C., had narrow drilled passages, were expensive to manufacture, were difficult to maintain, and were bulky.

My invention provides a rotary valve, operable at high temperatures above 250° C. and suitable for use in connection with gas chromatography.

My invention also provides a lubricant free rotary valve having minimum dead spaces, passages with minimum internal diameter and minimum leakage. The internal volumes within the valve lines can be altered with facility.

My invention provides a rotary valve including a pair of confronting body members arranged coaxially and mounted for rotation relative to each other about their common axis. A resilient valve seal is provided between the body members and maintained in a fixed angular relationship with one of the body members relative to the axis of the body member. The valve seal is also in sliding, sealing contact with the other body member. A pair of openings extend through the seal and a pair of passageways extend through the one body member which is in fixed angular relationship with the seal. The passageways register in fluid-tight contact with the openings through the seal. A pair of ports extend through the other body member and are interconnected by a conduit. The body members have a first relative angular position in which each of the ports registers one of the openings through the seal and a second relative angular position in which the ports are out of register with the openings through the seal. A means is also provided for rotating the body members relative to each other from the first position to the second position.

Advantageously, the passageways through the one body member can take the form of tubes passing through the body member. These tubes can also have a V-shaped annular groove at one of their ends thereby providing two sharp concentric annular edges. In such instance the grooves and annular edges are in sealing contact with the valve seal. Also advantageously, the ends of the tubes can extend slightly beyond the one body member and be embedded in the valve seal thereby retaining the seal in a fixed angular relationship with the one body member.

While my invention has been described above as having but two passageways through the one body member and but one pair of interconnected ports in the other body member, it will be understood that an apparatus embodying my invention can also be provided with several passageways through the one body member, e.g. 4, 5, 6 or more. The number of passageways that can be employed is limited only by the physical size of the particular apparatus being used. Similarly, the other body member can be provided with a plurality of pairs of interconnected ports. The exact number of pairs of ports employed is determined by the number of passageways in the one body member and the valving or switching function desired to be effected.

For a more complete description of my invention, reference is made to the appended drawings in which:

FIGURE 1 is an oblique projection of a form of rotary valve in accordance with my invention;

FIGURE 2 is a top sectional view of the rotary valve taken through lines II—II in FIGURE 1;

FIGURE 10 is a fragmentary, enlarged, cross-sectional view of aligned ports and openings in the valve of FIGURE 1.

Figure 3:
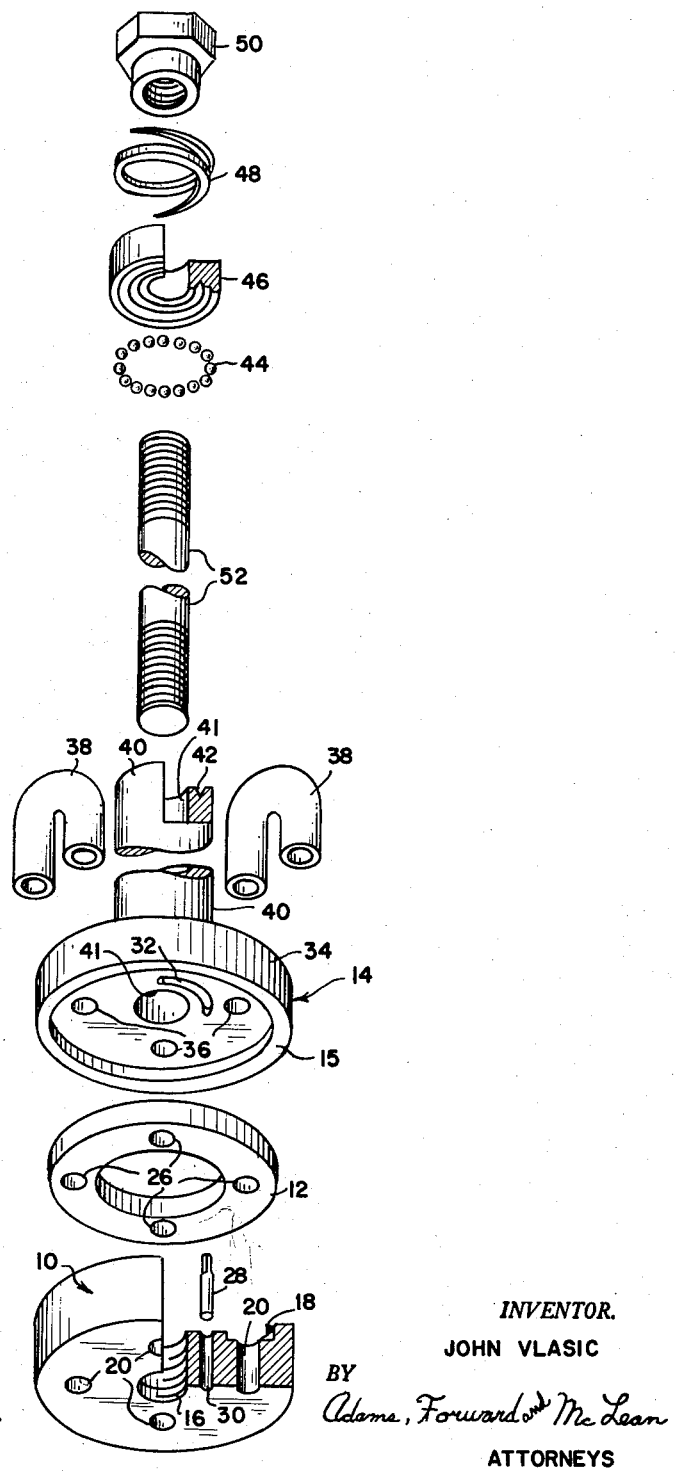
FIGURE 3 is an exploded oblique projection of the valve.
Figure 9:
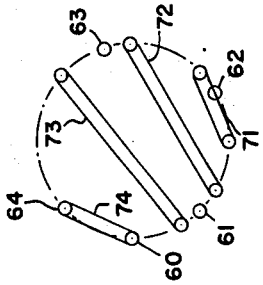
FIGURE 9 is the valve of FIGURE 6 in a fourth position.

The rotary valve shown in FIGURES 1, 2 and 3 includes a stationary body 10, an indexing pin 28, tubing 24, an annular valve seal 12, a rotatable body 14, port connector tubes 38, bolt 52, bearings 44, outer race 46, helical spring 48, and cap nut 50.

The stationary body 10, composed of metal and of drum-shape, is shown in a vertical position, having a greater diameter than height, with an axial, vertical hole 16 through its upper, flat, horizontal surface, hole 16 being tapped for receiving a threaded fastener. In the upper surface of the stationary body 10 is an annular groove 18 of rectangular cross section. Communicating between the lower horizontal surface of groove 18 and the under surface of the stationary body 10 are four vertical ports 20 having axes spaced equal radial distances from and at 90° intervals about the axis of the stationary body 10. Passing through each of the ports 20 is a tube 24 having a double edged V-grooved upper end surface extending through the port slightly above the lower surface of the groove 18 as shown in FIGURE 10. In a vertical hole 30 having an axis located between the axial hole 16 and the annular groove 18 on a radius intersecting the axis of body 10 and one port 20 is mounted a vertical indexing pin 28 in fixed position extending above the upper surface of the solid body 10.

The annular valve seal 12, having a rectangular cross-section, has an inner and an outer diameter equal respectively to those of the annular groove 18 in the stationary body 10, is composed of glass-filled polytetrafluoroethylene, is affixed in groove 18 projecting above the upper surface of body 10 and has vertical openings 26 passing through it axially aligned with the ports 20 in the stationary body 10. The sharp V-groove in the upper edges of the tubes 24 in ports 20, which project into annular groove 18 as shown in FIGURE 10, fit tightly against and dig into the surface surrounding openings 26 in the annular valve seal 12 to provide a fluid-tight seal between the ends of tubes 24 and valve seal 12.

The rotating body 14 which is composed of metal includes a lower drum-shaped portion 34 having a vertical axis, and an upper tubular portion 40 extending vertically and coaxially above the drum-shaped portion 34. The tubular portion 40 is of substantially smaller diameter than the drum-shaped portion 34 which is of equal diameter to the stationary body 10. An axial hole 41 of slightly greater diameter than the diameter of the axial hole 16 in the solid body 10 extends through the rotatable body 14 from the upper end of the tubular portion 40 to the under surface of the drum-shaped portion 34. Through the drum-shaped portion 34 outboard of tubular portion 40 are four vertical ports 36 spaced 90° apart having axes spaced from the axis of the rotating body by a distance equal to the distance between the axis of the stationary body 10 and axes of the ports 20 in it.

Connecting adjacent pairs of the upper ends of ports 36 in the drum-shaped portion 34 are two curved tubular metal port connectors 38 silver-soldered to the upper surface of the drum-shaped portion 34 and extending into the ports 36 a short distance.

Along the rim of the under surface of the drum-shaped portion is an annular flange 15 having an inner diameter equal to the outer diameter of the annular valve seat 12 and having a vertical dimension less than the vertical projection of the valve seal 12 above the upper surface of the stationary body 10. In the under surface of the drum-shaped portion 34 is an arcuate recess 32 of square cross-section extending 90° about the axis of the rotatable body 14, having its ends aligned with radii through the axis of the rotating body and the axes of two adjacent ports 36 in the drum-shaped portion 34, having its center a radial distance from the axis of the rotating body equal to the radial distance of the axis of the indexing pin from the axis of the stationary body 10.

Rotatable body 14 and stationary body 10 are assembled together by means of bolt 52 which is threaded at each end. The lower end of bolt 52 is secured in threaded engagement in tapped hole 16 of body 10, while its central, unthreaded portion extends up through axial hole 41 of body 14. The upper surface of body 10, in which seal 12 is mounted, is thus positioned beneath and confronting the undersurface of drum-shaped portion 34 of rotatable body 14 with the upper end of indexing pin 28 received in sliding engagement in arcuate channel 32. The upper surface of valve seal 12 abuts the undersurface of drum-shaped portion 34 and is peripherally, slidingly received by the inner face of flange 15. The upper end of tubular portion 40 is grooved to define a bearing race 42. A collar 46 is slidingly received on the upper end of bolt 52 and on its undersurface is grooved to define a second bearing race confronting bearing race 42. The bearing race on collar 46 and bearing race 42 carry between them a number of ball-bearings 44 and are urged together by a coil spring 48 received on the upper end of bolt 52 above collar 46 which is held compressed against collar 46 by a cap nut 50 threadedly received on bolt 52 above spring 48. A handle 54 is affixed to tubular portion 40 of rotatable body 14 to enable body 14 to be rotated relative to body 10.

It will be noted that by reason of the sliding reception of the upper end of indexing pin 28 in ninety degree arcuate slot 32 handle 54 can thus rotate body 14 ninety degrees relative to body 10. The positioning of slot 32 is such that at each end of the stroke of handle 54 the ports 36 in body 14 register with openings 26 in annular valve seal 12. Thus one pair of oppositely disposed ports 20 are alternately connected, each through a different connector 38 to a different adjacent port 20, at opposite ends of the stroke of handle 54 while at intermediate positions of handle 54 all ports 20 are closed from communication with each other, such that the resulting valve action is equivalent to a four way valve having cross-connected outlets and is useful, for example, in connecting the outlet of one chromatograph to the output of another in one open position, and in permitting independent operation of such chomatographs in the other open position.

It will also be noted that the employment of long tubular portion 40 with handle 54 disposed at its upper end remote from ports 36 and connectors 38 allows portion 40 to serve as a heat sink and minimizes the amount of heat transferred from the hot valve to handle 54, thus protecting spring 48 and maintaining constant the force holding together the first and second bodies 10 and 14.

Figure 5:
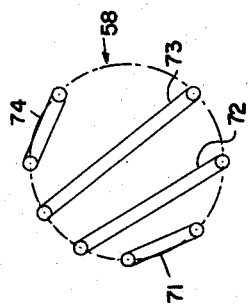
FIGURE 5 is a schematic drawing of port connectors of a distribution valve.
Figure 8:
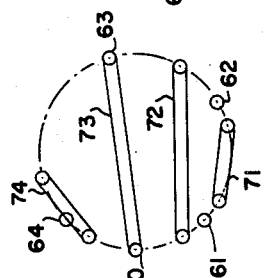
FIGURE 8 is the valve of FIGURE 6 in a third position.
Figure 7:
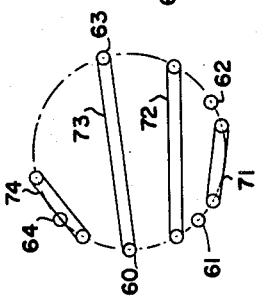
FIGURE 7 is the valve of FIGURE 6 in a second position.
Figure 4:
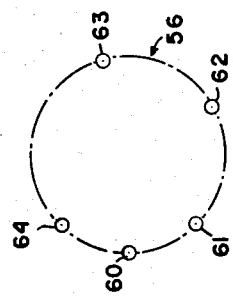
FIGURE 4 is a schematic drawing of the ports of a distribution valve.
Figure 6:
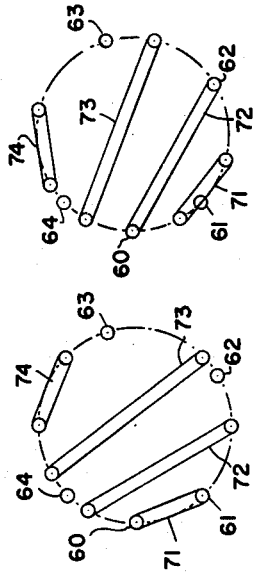
FIGURE 6 is a schematic drawing of the distribution valve with one port connector connecting the inlet port and a first outlet port.

In another aspect of my invention I provide a stationary body 56 having five ports, shown schematically in FIGURE 4, with an inlet port 60 and four outlet ports 61, 62, 63 and 64 displaced about the axis of the stationary body at various angles. The rotatable body 58, shown schematically in FIGURE 5, includes four port connectors 71, 72, 73 and 74 connecting to points about the axis of the rotatable body 58. Except for location and number of ports and port connectors, the structure is otherwise identical to that of FIGURES 1, 2 and 3. Connectors 71, 72, 73 and 74 are so disposed, that within a ninety degree rotation of rotatable body 58, the inlet port 60 can be connected to each one of the outlet ports 61, 62, 63 and 64 at a particular angle of rotation. This valve design provides a differential distribution valve capable of supplying 2 or more outlets from a single inlet.

The location of the outlet ports with respect to the inlet port 60 measuring counterclockwise about a circle coaxial with the vertical axis of the stationary body is as follows:

| Port: | Angular location |
|---|---|
| Inlet 60 | 0° |
| Outlets: | |
| 61 | 45° |
| 62 | 120° |
| 63 | 200° |
| 64 | 315° |

At the first position of the rotatable body 58 in which port connector 71 connects inlet 60 and outlet 61, the angular relationship of points connected by each respective port connector measuring counterclockwise as above is as follows:

| Port connector No.: | Connects points from— |
|---|---|
| 71 | 0° to 45° |
| 72 | 90° to 330° |
| 73 | 140° to 300° |
| 74 | 225° to 270° |

To connect individual outlets to the inlet port, the rotatable body must be rotated counterclockwise by the respective angles indicated below:

| Connection of— | Port connector | Rotation, degrees |
|---|---|---|
| Port 60 to port 61 | 71 | 0 |
| Port 60 to port 62 | 72 | 30 |
| Port 60 to port 63 | 73 | 60 |
| Port 60 to port 64 | 74 | 90 |

With these geometric relationships between the ports of the distribution gauge, for any of the positions indicated only one outlet port can be connected to inlet port 60, preventing undesirable connections between outlet ports and attendant mixing of gas samples.

In view of the above description of the differential valve system shown in FIGURES 5–9, it will be obvious to those skilled in the art that a variety of hole alignment patterns can be provided with different angular relationships between ports, with more or less ports, and that the above structure is only an example of a structure useful for a four-way distribution valve.

In addition the form of structure shown in FIGURES 1, 2 and 3 can be used with two or more pairs of ports arranged symmetrically as shown for a simple two-way valve. Of course the structure can be modified to provide a valve having three or more positions connecting different conduits together for any predetermined angular relationship between the rotating body 14 and the stationary body 10 as will be obvious to those skilled in the art.

Tests for thermal stability of the components of a system designed according to this invention showed reliable operation and pressure retention were possible above 300° C. when a valve seal composed of glass-filled polytetrafluoroethylene in a mixture of 85 wt. percent polytetrafluoroethylene to 15% wt. percent glass fibre was used. Polytetrafluoroethylene was used because of its excellent thermal stability and chemical resistance.

Further tests showed only slight leakage between ports and the exterior and very small amounts of leakage between ports. Tests at 350° C. and 100 p.s.i.g. helium have shown pressure retention with negligible leakage. The ends of the tubes 24 are designed to lengthen the leakage path, see FIGURE 10, adjustable retaining cap 50 and spring 48 are used to retain the smooth confronting surfaces of rotating body 14 and valve seal 12 in tight and close contact.

Another aspect of this invention includes using tubing unions of various lengths to vary the lengths and volumes of the port connectors so that the valve can be used for many different applications, for example, to trap a specified volume of sample in a sample line and to transfer such sample to a carrier line.

I claim:

A rotary valve including a pair of coaxially disposed, confronting body members mounted for rotation relative to each other about their common axis, a resilient valve seal disposed intermediate said body members, means retaining said seal in a fixed angular relationship with one of said body members relative to the axis of said body member, said seal being in sliding, sealing contact with a portion of the other of said body members, means defining a pair of openings through said seal, means defining a pair of passageways through said one body member, each said passageway registering in fluid-tight contact with a said opening through said seal, means defining a pair of ports in said other body member, means defining a conduit interconnecting said ports, said body members having a first relative angular position in which each said port in said other body member registers with a said opening through said seal and a second relative angular position in which said ports in said other body member are out of register with said openings through said seal, and means for rotating said body members relative to each other from said first position to said second position, said passageways through said one body member comprising tubes passing through said one body member having means defining V-shaped annular grooves at one end of each tube providing two sharp concentric annular edges at said one end of each tube, which ends of said tubes extend beyond said one body member and are embedded in said valve seal thereby comprising said means retaining said seal in a fixed angular relationship with said one of said body members.

References Cited in the file of this patent

UNITED STATES PATENTS 2,757,541   Watson et al. _____ Aug. 7, 1956